United States Patent [19]

Woodland et al.

[11] Patent Number: 5,760,562

[45] Date of Patent: *Jun. 2, 1998

[54] APPARATUS AND METHOD FOR GENERATING DIGITAL POSITION SIGNALS FOR A ROTATABLE SHAFT

[75] Inventors: Lane L. Woodland, Burlington; Daryl J. Marvin, Unionville, both of Conn.

[73] Assignee: Dana Corporation, Toledo, Ohio

[*] Notice: The term of this patent shall not extend beyond the expiration date of Pat. No. 5,646,496.

[21] Appl. No.: 869,456

[22] Filed: Jun. 5, 1997

Related U.S. Application Data

[63] Continuation of Ser. No. 619,267, Mar. 18, 1996, Pat. No. 5,646,496, which is a continuation of Ser. No. 336,317, Nov. 8, 1994, abandoned.

[51] Int. Cl.$^6$ .................................................. G05B 19/31
[52] U.S. Cl. ........................ 318/632; 318/779; 341/115; 341/116
[58] Field of Search .................... 318/138, 245, 318/254, 439, 560–696; 364/474.01–474.32; 324/165, 160, 161; 250/231 SE; 340/347 P, 870.04, 870.32, 870.34, 870.21; 341/112–116, 347 SV, 347 CC, 110, 117

[56] References Cited

U.S. PATENT DOCUMENTS

| | | |
|---|---|---|
| 3,577,088 | 5/1971 | Goggins, Jr. . |
| 3,579,268 | 5/1971 | Steiger . |
| 3,688,303 | 8/1972 | Metz . |
| 3,984,831 | 10/1976 | Jones et al. . |
| 4,281,316 | 7/1981 | Simon et al. . |
| 4,334,272 | 6/1982 | Imazeki et al. . |
| 4,454,458 | 6/1984 | Holland . |
| 4,468,617 | 8/1984 | Ringwall . |
| 4,558,304 | 12/1985 | Wand . |
| 4,575,667 | 3/1986 | Kurakake . |
| 4,591,774 | 5/1986 | Ferris et al. . |
| 4,591,831 | 5/1986 | D'Anci . |
| 4,623,831 | 11/1986 | Sakamoto et al. . |
| 4,712,106 | 12/1987 | McNally . |
| 4,733,117 | 3/1988 | Perrins . |
| 4,758,787 | 7/1988 | Howley . |
| 4,837,493 | 6/1989 | Maeno et al. . |
| 4,843,291 | 6/1989 | Predina . |
| 4,847,879 | 7/1989 | Iijima et al. . |
| 4,884,016 | 11/1989 | Aiello . |
| 4,933,674 | 6/1990 | Gasperi et al. . |
| 4,972,186 | 11/1990 | Morris . |

(List continued on next page.)

*Primary Examiner*—Paul Ip
*Attorney, Agent, or Firm*—MacMillan, Sobanski & Todd

[57] ABSTRACT

An apparatus and method for generating digital electrical signals which are representative of the angular position and rotational velocity of a rotatable shaft component in a servomechanism includes a resolver which is connected to the rotatable component. The resolver generates analog electrical output signals which are representative of an excitation signal modulated by both the sine and cosine of the electrical angular or position of the motor. The output signals from the resolver are fed to a digital signal processing circuit which employs software algorithm techniques to define a plurality of tasks which are implemented sequentially to obtain the desired angular position and velocity signals. First, the sine and cosine signals are read from the resolver through respective analog-to-digital converters. The sine and cosine signals are demodulated by multiplication with the excitation signal, and the undesired higher frequency components are deleted by filtering. Then, the demodulated sine and cosine signals are conditioned to insure quadrature and to correct for amplitude and offset variations. Next, an electrical angular position signal for the rotatable member is determined by combining the demodulated and conditioned sine and cosine signals, and a correction is made for repeatable harmonic errors. A calculation is then made to determine the rotational velocity of the rotatable member. The electrical angular position signal is next corrected for velocity related errors to generate an actual electrical position signal. Lastly, an actual mechanical position signal for the rotatable member is calculated.

33 Claims, 4 Drawing Sheets

U.S. PATENT DOCUMENTS

| | | |
|---|---|---|
| 4,989,001 | 1/1991 | Serev . |
| 4,992,716 | 2/1991 | Ellis . |
| 5,041,829 | 8/1991 | Garrett . |
| 5,121,116 | 6/1992 | Taniguchi . |
| 5,162,798 | 11/1992 | Yundt . |
| 5,196,776 | 3/1993 | Shipley . |
| 5,235,406 | 8/1993 | Ishii et al. . |
| 5,347,355 | 9/1994 | Eguchi . |
| 5,451,945 | 9/1995 | Alhorn et al. . |
| 5,461,293 | 10/1995 | Rozman et al. .......................... 318/603 |
| 5,495,162 | 2/1996 | Rozman et al. .......................... 322/10 |
| 5,495,163 | 2/1996 | Rozman et al. .......................... 322/10 |

APPARATUS AND METHOD FOR GENERATING DIGITAL POSITION SIGNALS FOR A ROTATABLE SHAFT

CROSS REFERENCE TO RELATED APPLICATION

This application is a continuation of Ser. No. 08/336,317 filed Nov. 8, 1994, now abandoned. This is a continuation of Ser. No. 08/619,267 filed Mar. 18, 1996, now U.S. Pat. No. 5,646,496.

BACKGROUND OF THE INVENTION

This invention relates in general to position sensing devices for mechanisms which contain a movable member. More specifically, this invention relates to an apparatus and method for generating digital electrical signals which are representative of the angular position and rotational velocity of a rotatable shaft or similar movable mechanical component in an electromechanical servomechanism.

Generally speaking, a servomechanism is a control system which controls an output physical quantity in response to an input command function. Frequently, the servomechanism is embodied as an electromechanical control system, wherein a mechanical output component is moved in accordance with an electrical input signal. However, non-mechanical output quantities, such as temperature, pressure, voltage, etc., may be controlled in response to non-electrical input functions. Usually, the servomechanism includes a closed feedback loop, wherein a signal which is representative of the current status of the output physical quantity is compared with the current input command function. If there is a difference between the two, an error signal is generated which tends to urge the output physical quantity into compliance with the input command function.

In a typical electromechanical servomechanism, the output mechanical component may be a shaft which is rotated about an axis in accordance with a predetermined electrical input position signal. The servomechanism can function to rotate the shaft at a certain rotational velocity, to move the shaft to a certain rotational position, or to apply a certain torque or tension to a load in response to the electrical input signal. For example, most electric motors contain a rotor shaft which is driven to rotate about an axis relative to a stationary stator. Many conventional electric motors are controlled so as to rotate the rotor shaft at a certain rotational velocity relative to the stator in response to electrical input signal. Such conventional electric motors can be used to rotate the shaft at a certain rotational velocity, to move the shaft to a certain rotational position, or to apply a certain torque or tension to a load in response to the electrical input signal.

In such servomechanisms, it is often desirable or necessary to know what the precise status of the output physical quantity is at any given point in time. As mentioned above, the servomechanism usually includes a closed feedback loop, wherein a signal representative of the current status of the output physical quantity is compared with the current input command function. In the electric motor example mentioned above, it is often necessary or desirable to know what the precise rotational velocity or position of the rotor shaft is relative to the stator. The rotational velocity or position signal can be used in several manners to improve the operation of the electric motor. For instance, the rotational position signal can be used to increase the accuracy of the rotational velocity or angular position of the rotor shaft relative to the stator. Also, the rotational position signal can be used to control the timing of the energizations and de-energizations of the windings of the electric motor in order to increase efficiency and reduce undesirable torque ripple.

The rotational position signal of the rotor shaft in an electric motor is usually expressed as an electrical signal, either analog or digital in nature, which is representative of the angular position of the rotor shaft relative to a predetermined starting or reference position. Thus, the rotational position signal can be expressed as an analog or digital signal which is representative of a number between 0° and 360°, wherein 0° represents the predetermined starting position or reference position of the rotor shaft relative to the stator. A number of devices are known in the art for generating electrical signals which are representative of the angular position of the rotor shaft relative to a predetermined starting or reference position.

A resolver is one well known device for generating electrical signals which are representative of the relative angular position of a rotatable shaft. Generally speaking, a resolver is an electromechanical transducer which generates one or more output signals which vary in magnitude with the rotational position of the rotor shaft. Typically, the resolver generates two analog electrical output signals, one which is representative of the sine of the relative angle of the rotor shaft, and the other which is representative of the cosine of the relative angle of the rotor shaft. A number of different resolver structures are known in the art for performing this general function. The analog output signals may be used to control the operation of the servomechanism. Alternatively, it is known to convert the analog electrical output signals to respective digital electrical signals for subsequent use by a digital computing device, such as a microprocessor, in controlling the operation of the servomechanism.

While generally effective for many applications, known resolvers can generate errors in the analog electrical output signals which can reduce the accuracy of the resultant rotor shaft position signal. For example, errors may be introduced within the structure of the resolver itself which can cause the two electrical output signals to vary in amplitude, offset, and quadrature. Similar errors may also be introduced in such signals when they are processed by the other components of the servomechanism. It is known to use electrical devices to attempt to compensate for such errors in the output signals from the resolver. However, while known error compensation devices are effective for correcting known errors which are relatively constant over a period of time, they are not well suited for correcting errors which may vary over time, such as may occur as a result of changes in temperature and the like. Thus, it would be desirable to provide an apparatus and method which is effective for correcting time varying errors which are generated in known resolvers so as to improve the overall accuracy of the position measurement and to permit the use of simpler and lower cost resolver structures.

SUMMARY OF THE INVENTION

This invention relates to an apparatus and method for generating digital electrical signals which are representative of the angular position and rotational velocity of a rotatable shaft or similar movable mechanical component in a servomechanism. The apparatus includes a resolver which is connected to the rotatable component. The resolver generates analog electrical output signals which are representative of an excitation signal modulated by both the sine and cosine of the electrical angular or position of the motor. The output signals from the resolver are fed to a digital signal processing circuit which, in the preferred embodiment, employs software algorithm techniques to define a plurality of tasks which are implemented sequentially to obtain the desired angular position and velocity signals. First, the sine and cosine signals are read from the resolver through respective analog-to-digital converters. The sine and cosine signals are demodulated by multiplication with the excitation signal, and the undesired higher frequency components are deleted by filtering. Then, the demodulated sine and cosine signals are conditioned to insure quadrature and to correct for amplitude and offset variations. Next, an electrical angular position signal for the rotatable member is determined by combining the demodulated and conditioned sine and cosine signals, and a correction is made for repeatable harmonic errors. A calculation is then made to determine the rotational velocity of the rotatable member. The electrical angular position signal is next corrected for velocity related errors to generate an actual electrical position signal. The actual electrical position signal can be used to control commutation of the phase currents in an electric motor, which forms part of the servomechanism. Lastly, an actual mechanical position signal for the rotatable member is calculated. The actual mechanical position signal can be fed to a position controller circuit as a feedback signal to provide a closed loop servomechanism.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
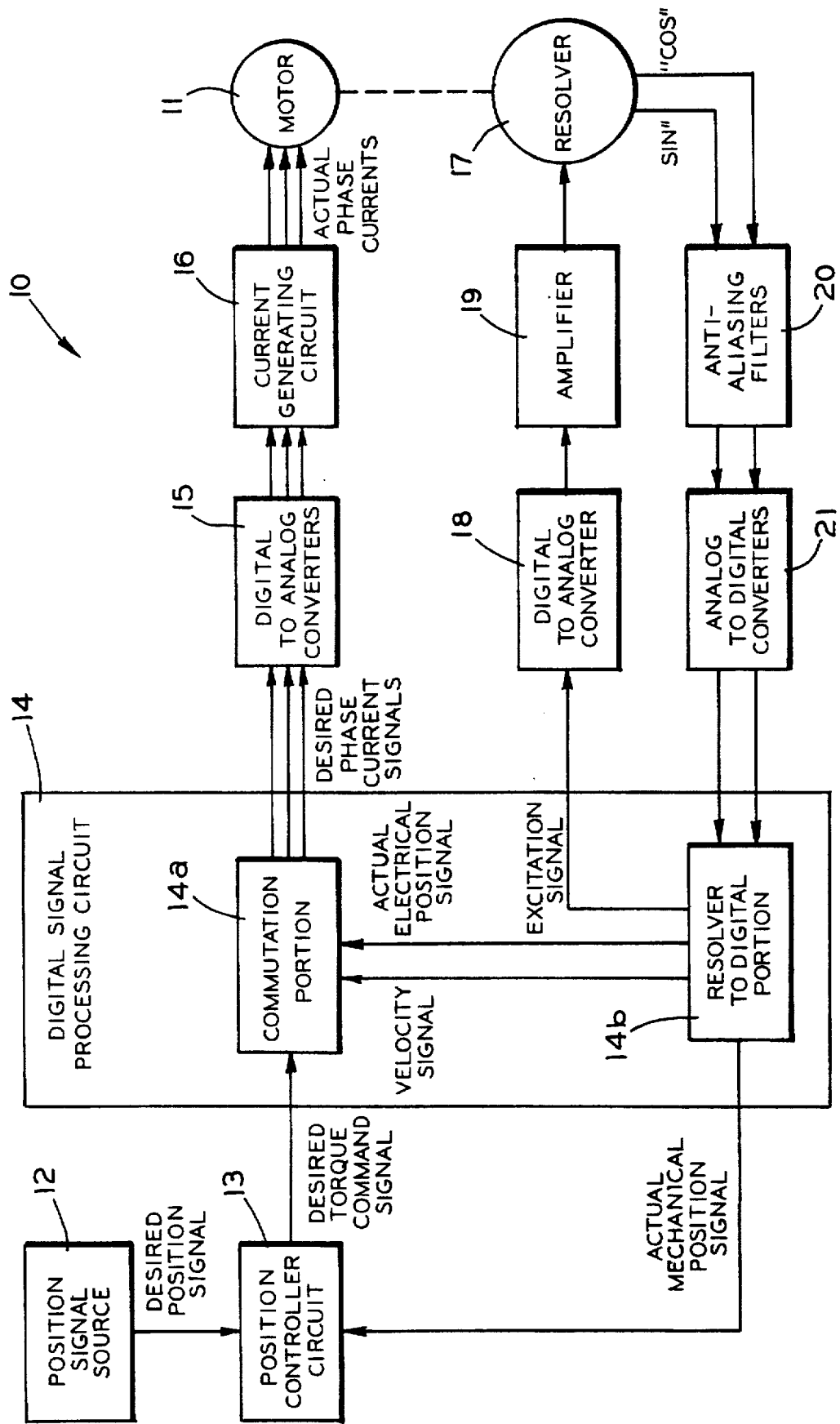
FIG. 1 is a block diagram of an electromechanical servomechanism including an apparatus and method for generating digital electrical signals which are representative of the angular position and rotational velocity of a rotatable shaft in accordance with this invention.

Referring now to the drawings, there is illustrated in FIG. 1 a block diagram of a servomechanism, indicated generally at 10, in accordance with this invention. The illustrated servomechanism 10 is an electromechanical control system wherein a motor 11 is operated in accordance with an electrical input signal provided from an external position signal source 12. Although this invention will be explained and illustrated in the embodiment of such an electromechanical servomechanism, it will be appreciated that this invention may be used in other applications wherein it is necessary or desirable to determine linear or angular position and velocity of a movable mechanical component.

The motor 11 is conventional in the art and includes a stationary stator (not shown) having an output shaft or rotor (not shown) supported for rotation therein. A plurality of windings of an electrical conductor are provided in the motor 11 so as to drive the rotor for rotation relative to the stator, preferably in either of two rotational directions. The rotor of the motor 11 is mechanically connected to a load for movement when the motor 11 is actuated as described below. The position signal source 12 may be embodied as any conventional circuit for generating an electrical signal which is representative of a desired position for the rotor and, thus, the load. For example, the position signal source 12 may be a conventional joystick device or the output of an electronic computing device.

The desired position signal from the position signal source 12 is fed to a first input of a position controller circuit 13. As will be explained in detail below, the position controller circuit 13 compares the desired position signal from the position signal source 12 (which represents the desired position of the rotor) with an electrical signal fed to a second input of the position controller circuit 13 (which represents the actual position for the rotor). By comparing the desired position of the rotor with the actual position thereof, the position controller circuit 13 can determine what operation of the motor 11 (if any) is necessary to make the actual position of the rotor the same as the desired position thereof. The output signal from the position controller circuit 13, therefore, is an electrical signal which is representative of a desired torque command to operate the motor 11. The desired torque command signal can be either analog or digital in nature. The structure and operation of the position controller circuit 13 is conventional in the art.

The output signal from the position controller circuit 13 is fed to a digital signal processing circuit 14. The digital processing circuit 14 can be embodied as a conventional microprocessor or other electronic programmable computational device, such as a TMS320C30 digital signal processor manufactured by Texas Instruments. As shown in FIG. 1, the digital processing circuit 14 includes a commutation portion 14a which is responsive to (among other things) the torque command signal from the position controller circuit 13 for generating one or more digital output signals which are representative of the desired electrical current for each of the electrical phases of the motor 11. In the illustrated embodiment, the motor 11 has three electrical phases. Thus, the commutation portion 14a of the digital processing circuit 14 generates three digital output signals over three separate output lines. The commutation portion 14a of the digital processing circuit 14 is preferably (but not necessarily) embodied as software which is executed by the microprocessor. Software for performing this commutation function is known in the art.

The three output signals from the digital signal processing circuit 14 are fed through respective conventional digital-to-analog converters 15 to a current generator circuit 16. The current generator circuit 16 is conventional in the art and can include a current loop and power electronic circuit for generating the desired electrical current to each of the three phases of the motor 11. The current generator circuit 16 can also include a current sensing feedback circuit (not shown) from the motor 11 for insuring that the actual electrical current supplied to the motor 11 is equal to the desired electrical current. The three outputs from the current generator circuit 16 are respectively connected to the phase windings of the motor 11. Thus, the rotor of the motor 11 is rotatably driven in accordance with the electrical input signal provided from the external position signal source 12.

The illustrated servomechanism 10 includes a closed feedback loop, wherein the actual mechanical position of the rotor is compared with the desired mechanical position thereof, as represented by the signal from the position signal source 12. To accomplish this, the servomechanism 10 further includes a resolver 17 which is connected to the motor 11. The resolver 17 can be embodied as any conventional electromechanical transducer which generates one or more output signals which vary in magnitude with the rotational position of the rotor. In the illustrated embodiment, as is known in the art, an excitation signal is provided to the resolver 17 from the digital signal processing circuit 14 through a digital-to-analog converter 18 and an amplifier 19. The excitation signal may, alternatively, be generated as an analog signal, in which case the digital-to-analog converter 18 would not be necessary.

In response to the excitation signal and the rotation of the rotor of the motor 11 relative to the stator, the resolver 17 generates two analog electrical output signals. The resolver 17 can be formed as a doubly salient pole variable reluctance device, including a first toothed member which is rotatable with the rotor of the motor 11 relative to a second stationary toothed member. However, other non-salient resolver structures may be used. Preferably, but not necessarily, the rotatable member of the resolver 17 is angularly aligned with the rotor of the motor 11. Regardless, the resolver 17 modulates the excitation signal by the position of the rotor of the motor 11 relative to the stator. Thus, one of the analog output signals from the resolver 17 is representative of the sine of the angle of the rotor relative to a predetermined starting or reference position (a 0° position) on the stator. The other analog output signal from the resolver 17 is representative of the cosine of the angle of the rotor relative to the predetermined starting or reference position. As is well known, rotation of the rotor causes the resolver 17 to generate analog electrical output signals which are representative of the sine and cosine of the relative electrical angular position of the resolver 17, which varies from 0° and 360°.

The output signals from the resolver 17 are fed through respective conventional anti-aliasing filters 20 and analog-to-digital converters 21 to a second input of the digital signal processing circuit 14. As shown in FIG. 1, the digital processing circuit 14 also includes a resolver-to-digital portion 14b which may be, but is not necessarily, embodied as software which is executed by the microprocessor mentioned above. The resolver-to-digital portion 14b of the digital signal processing circuit 14 is responsive to the output signals from the resolver 17 for generating a plurality of digital output signals.

A first output signal from the resolver-to-digital portion 14b of the digital processing circuit 14 represents the actual electrical position of the rotor relative to the stator. This first signal is fed to the commutation portion 14a of the digital signal processing circuit 14 for generating the digital output signals which are representative of the desired electrical current for each of the electrical phases of the motor 11, as described above. As mentioned above, it is preferable that the rotatable member of the resolver 17 be angularly aligned with the rotor of the motor 11. If it is not, a conventional fixed offset can be introduced into the first signal to address this non-alignment. A second output signal from the resolver-to-digital portion 14b of the digital processing circuit 14 represents the actual mechanical position of the rotor relative to the stator. This second signal is fed to the position controller circuit 13 to determine what operation of the motor 11 (if any) is necessary to make the actual position of the rotor the same as the desired position thereof, as also described above. A third output signal from the resolver-to-digital portion 14b of the digital processing circuit 14 represents the rotational velocity of the rotor. This third signal is also fed to the commutation portion 14a of the digital signal processing circuit 14 for generating the digital output signals which are representative of the desired electrical current for each of the electrical phases of the motor 11, as described above. A fourth output signal generated by the resolver-to-digital portion 14b of the digital signal processing circuit 14 is the excitation signal mentioned above in connection with the resolver 17. The excitation signal is fed through the digital-to-analog converter 18 and the amplifier 19 to the resolver 17.

Figure 2:
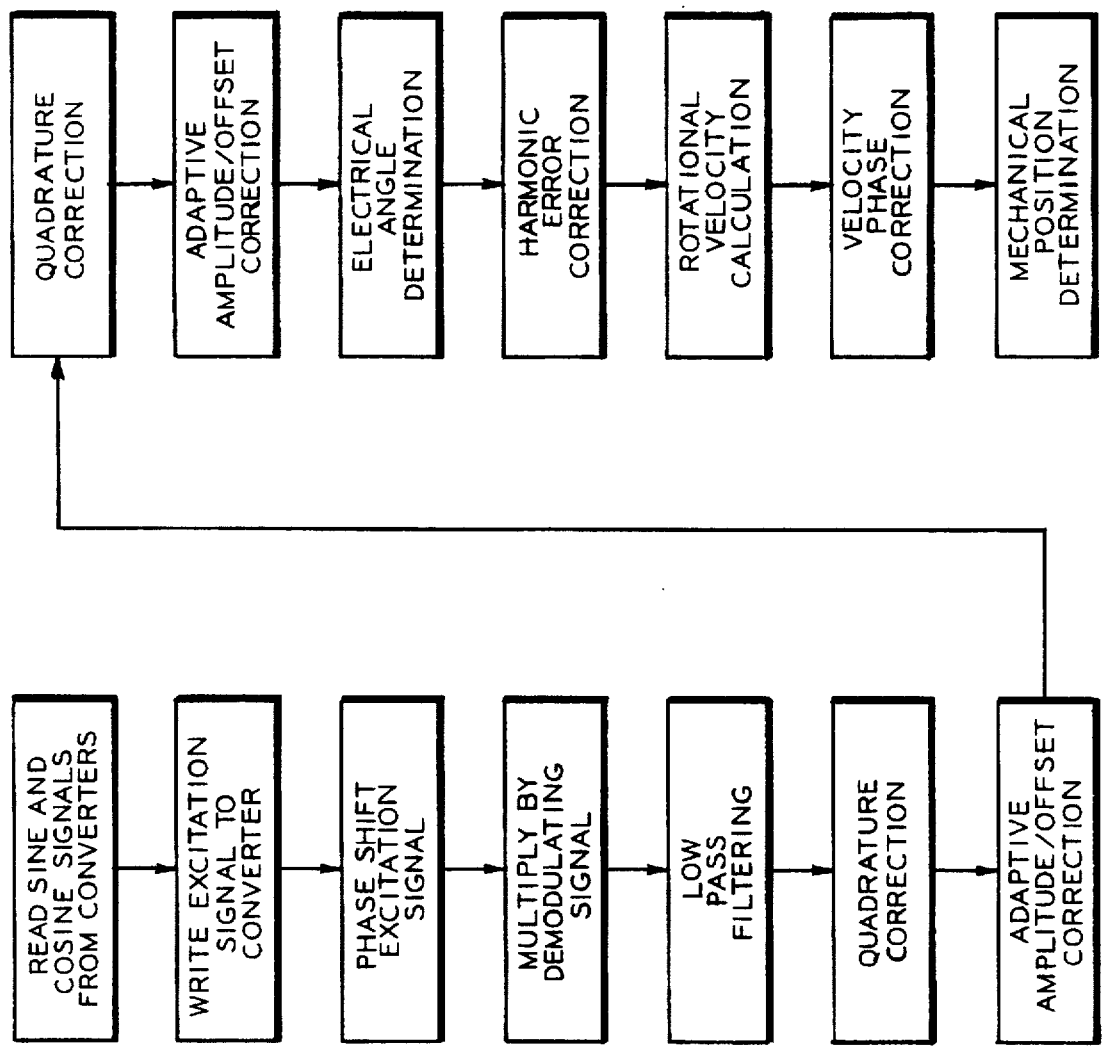
FIG. 2 is a flowchart illustrating the steps of the algorithm performed by the resolver-to-digital portion of the digital signal processing circuit illustrated in FIG. 1.
Figure 3A:
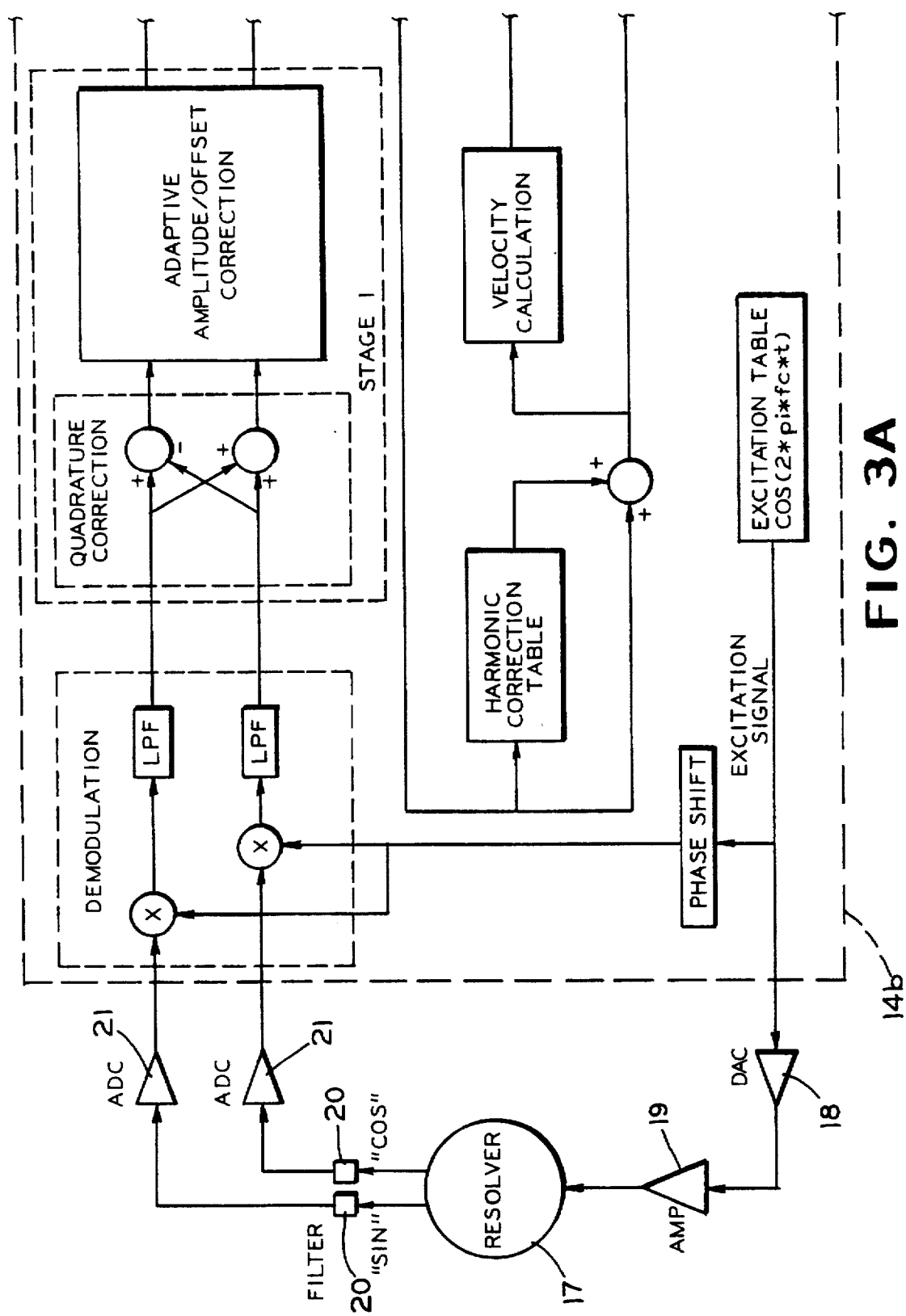
FIGS. 3A and 3B are, in combination, a block diagram which graphically illustrates the steps of the flowchart illustrated in FIG. 2.
Figure 3B:
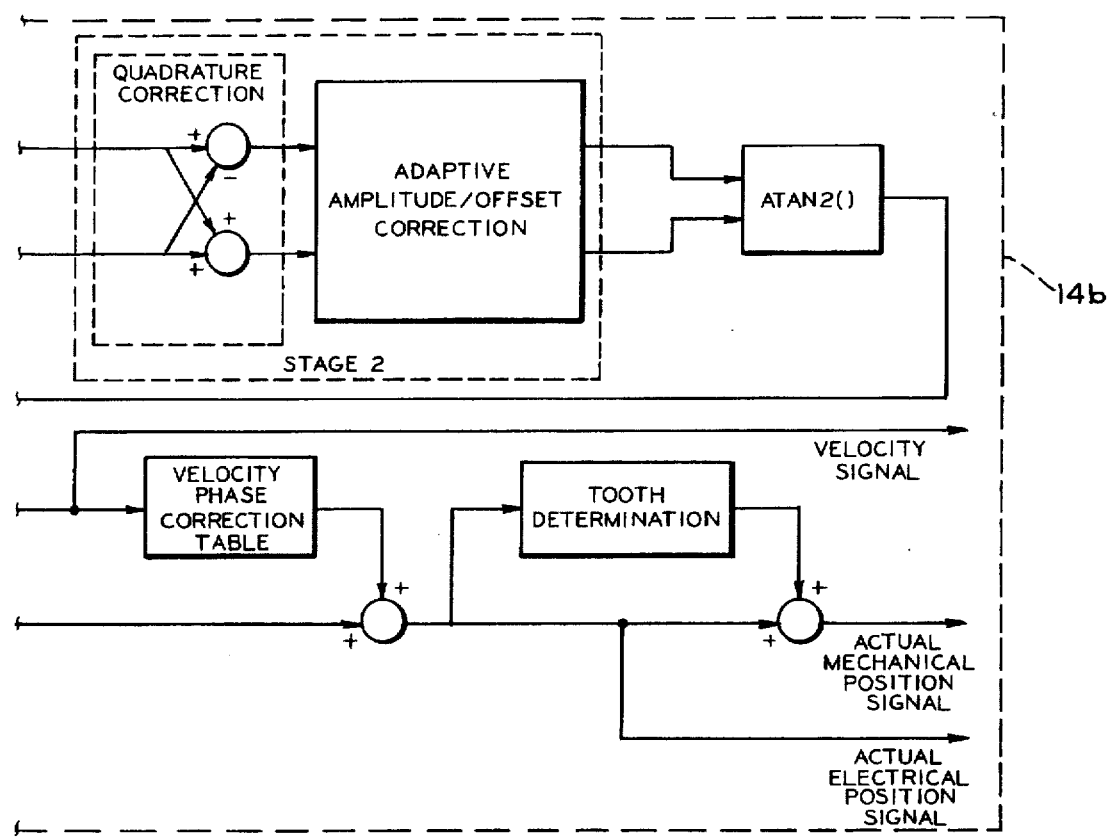

Referring now to FIG. 2, there is illustrated a flowchart of the steps of the algorithm performed by the resolver-to-digital portion 14b of the digital signal processing circuit 14 discussed above. FIGS. 3A and 3B are, in combination, is a block diagram which graphically illustrates the steps of this flowchart. In the preferred embodiment of this invention, all of the steps which are disclosed in the flowchart of FIG. 2 and which are graphically represented in the block diagram of FIGS. 3A and 3B are embodied as software which is programmed into and executed by the digital signal processing circuit 14. Nonetheless, it will be appreciated that some or all of the steps illustrated in FIG. 2, as well as some or all of the block diagram of FIGS. 3A and 3B may be reduced into and performed by equivalent hardware components.

As discussed above, the resolver-to-digital portion 14b of the digital signal processing circuit 14 is provided to translate the modulated sine and cosine signals from the resolver 17 into a variety of digital output signals. The first step in this process, as illustrated in FIG. 2, is to perform input and output signal functions for the digital signal processing circuit 14. This step can be accomplished by performing two operations. The first operation is that the two output signals from the resolver 14 are read and temporarily stored by the digital signal processing circuit 14. To generate accurate information regarding the position of the rotor relative to the stator, the two output signals from the resolver 17 should be sampled simultaneously by the resolver-to-digital portion 14b of the digital signal processing circuit 14. As discussed above, the two output signals from the resolver 14 are fed through the respective anti-aliasing filters 20 and the analog-to-digital converters 21 to the digital signal processing circuit 14. Such converters 21 are preferably provided or used in conjunction with respective sample-and-hold circuits so that the two signals can be sampled simultaneously, but processed sequentially by the digital signal processing circuit 14. If desired, a conventional multiplexing device can be used in conjunction with the analog-to-digital converters 21. Other known analog-to-digital methods can also be used.

The second operation in this step of the process is to generate the excitation signal to the resolver 17, in anticipation of the next measurement of the relative rotor position. To accomplish this, the digital signal processing circuit 14 generates a digital signal to the digital-to-analog converter 18 which is representative of the excitation signal. Preferably, the excitation signal is a sinusoidal signal having a frequency which is much greater (on the order of ten times greater or more) than the highest frequency of the electrical angle of the resolver 17. For example, if the highest frequency of the electrical angle of the resolver 17 is 172 cycles per second, the frequency of the excitation signal may be approximately 3200 cycles per second.

The second step of this process, as illustrated in FIG. 2, is to perform a demodulation function for the two output signals from the resolver 17. This step can be accomplished by performing three operations. The first operation in this step is to introduce a predetermined phase shift into the excitation signal which is to be used for demodulation. This is done to compensate for the phase shift which is introduced into the excitation signal by the combined operations of the digital-to-analog converter 18, the amplifier 19, the resolver 17, the anti-aliasing filters 20, and the analog-to-digital converter 21. The amount of this phase shift can be determined in a relatively easy manner using known techniques and may be in the range of from 10° to 15°. By introducing a phase shift in the excitation signal which is to be used for demodulation which is the same as the phase shift in the two output signals from the resolver 17, errors which would otherwise be created by the phase shift differential are eliminated.

The second operation in this step of the process is to multiply each of the two output signals from the resolver 17 by the phase-shifted excitation signal. As is well known, such multiplication demodulates each of the two output signals from the resolver 17 so as to recover the signals which were used by the resolver 17 to modulate the excitation signal. However, as is also known in the art, such multiplication also generates higher frequency signal components which are extraneous with respect to the desired sine and cosine signals from the resolver 17. Accordingly, the third operation in this step of the process is to remove such extraneous higher frequency signal components. In the illustrated embodiment, wherein the entire process is performed by the digital signal processing circuit 14, the removal of the extraneous higher frequency components is done mathematically. However, it can be seen that this step is effectively the equivalent of passing each of the two multiplied signals through respective low pass filters.

At this point in the process, the two raw demodulated signals (indicated as "SIN" and "COS" in FIGS. 1 and 3) may or may not be precisely representative of true sine and cosine values for the electrical phase of the rotor of the motor 11. This is because the resolver 17 itself may introduce errors into the two output signals therefrom. One error can be an imperfect quadrature between the two signals (i.e., the sine and cosine signals are not precisely 90° out of phase from one another), which may be caused by imperfect machining or assembly of the resolver 17. A second error can be a DC offset in the two signals, which may be caused by imperfect cancellation of the even harmonics in the resolver 17. A third error can be an amplitude imbalance between the two signals, which may be caused by an unbalanced excitation of the phases of the resolver 17, unbalanced inductances between the phases of the resolver 17, or variations in the air gap of the resolver 17. Difficulties can arise in compensating for these errors because they change over a period of time, such as in response to ambient temperature variations.

To address these errors, the third step of this process, as illustrated in FIG. 2, is to condition the two signals to insure quadrature and to correct for amplitude and offset variations. This step can be accomplished by performing two operations. The first operation in this step is to insure that the two signals are in quadrature. This can be done by mathematically adding and subtracting the two raw demodulated signals from one another as follows:

"SIN"+"COS"=sin θ+sin (θ+φ)=2 cos (0.5φ) sin (θ+0.5φ)

"SIN"−"COS"=sin θ−sin (θ+φ)=2 sin (0.5φ) cos (θ+0.5φ)

wherein θ is equal to the electrical phase of the rotor of the motor 11 and φ is equal to the phase difference between the two signals. From these two equations, it can be seen that even if the two signals are not in quadrature (i.e., if φ≠900°), the resulting signals will be in quadrature. However, the amplitudes of the signals will be changed slightly.

Having conditioned the two signals to insure quadrature, the second operation in this step is to adaptively correct for variations in the offset and amplitude of the two signals. The objective of this operation is to normalize the sine and cosine signals based upon updated offset and amplitude information so as to adaptively compensate for offset and amplitude drift. This can be done by defining initial conditions for offset and amplitude. The initial conditions can be provided in a look-up table created or stored in the digital signal processing circuit 14 for each of the two signals and for different electrical cycles of the resolver 17. The initial conditions may be a function of resolver tooth geometry, bearing run-out, rotatable member eccentricity, and the like.

Having defined these initial conditions, the appropriate offset value is subtracted from one of the present signals, the sine signal, for example. Then, a determination is made as to whether that offset corrected sine signal is equal to zero. If not, the appropriate offset value is subtracted from the other of the present signals (the cosine signal), and a similar determination is made as to whether that offset corrected cosine signal is equal to zero. If no zero crossing has occurred, the next sine and cosine signals are read and analyzed in the same manner. This process continues until it is determined that one of the signals has decreased to zero.

Because the two signals have already been conditioned to be in quadrature, it is known that the sine signal is at either a maximum or minimum value when the cosine signal is zero. Similarly, it is also known that the cosine signal is at either a maximum or minimum value when the sine signal is zero. Thus, by monitoring when one of the signals crosses zero, it can be determined when the other signal is at either a maximum or minimum value. The maximum and minimum values can be determined by other methods if desired, such as by calculating when the time derivative of the signal changes sign from positive to negative or from negative to positive. However, the disclosed method is preferable because unlike the time derivative method, it is unaffected by changes in the rotational direction of the rotor.

Having determined that a zero crossing has occurred for one of the signals, approximations of the present value for the amplitude and the offset of the other signal to be corrected can be calculated as follows:

Present Amplitude=0.5[maximum value−(−Past Amplitude)]

Present Offset=0.5[maximum value+(−Past Amplitude)].

Alternatively, the approximations of the present value for the amplitude and the offset of the signal to be corrected can be calculated as follows:

Present Amplitude=0.5[Past Amplitude−minimum value]

Present Offset=0.5[Past Amplitude+minimum value].

The above equations can be also written as follows:

Present Amplitude=0.5[Past Amplitude+|SIG|]

Present Offset=Past Offset+0.5[SIG−Past Amplitude], wherein SIG is equal to the present maximum or minimum value of the signal being corrected. Using these equations, sufficiently accurate approximations of the values of the present amplitude and present offset can be calculated, based upon either the maximum or minimum values of both the sine and cosine signals.

Using the present values of the amplitude as obtained above, it remains only to correct or normalize the signal being corrected to compensate for any changes in the amplitude. This can be done by dividing the offset corrected signal by its present amplitude, as obtained above. Thus, it can be seen that the method of this invention contemplates that updated normalized values for the sine and cosine signals are calculated to correct for drifting in amplitude and offset.

The above equations can be implemented by the microprocessor contained with the digital signal processing circuit 14. However, while the above equations work well, they do require that two mathematical divisions be performed by the microprocessor of the digital signal processing circuit 14. Such mathematical divisions are relatively time consuming for most relatively inexpensive microprocessors to perform. To avoid this, it is preferable that the inverse of the present amplitude be calculated to permit a faster mathematical multiplication to be performed by the microprocessor. The inverse of the present amplitude can be calculated using the following iterative technique:

$$y_{n+1}=y_n[2-(x)(y_n)], \text{ where } y \to 1/x \text{ as } n \to \infty.$$

Using this technique, and by making slight approximations, the two equations set forth above can be rewritten as follows:

$$a_{PRESENT}=a_{PAST}\{1.5-0.5|(SIG)(a_{PAST})|\}$$

Present Offset=Past Offset+0.5SIG{|(SIG)($a_{PAST}$)|
[|(SIG)($a_{PAST}$)|(|(SIG)($a_{PAST}$)|−4)+6]−3}, wherein $a_{PRESENT}$ is the inverse of the present amplitude and $a_{PAST}$ is the inverse of the past amplitude. Using these equations, an effective adaptive amplitude and offset correction scheme can be implemented in software with a feasible execution time.

Ideally, the output signals from the resolver 17 have been conditioned at this point to insure perfect quadrature and to adaptively correct for variations in amplitude and offset. However, it has been found that the two signals may not be in exact quadrature at this point because the quadrature correction process described above works precisely only if the amplitudes of the two signals are equal. In practice, the amplitudes of the two signals are usually not sufficiently close as would be desirable. Thus, in the preferred embodiment of this invention, the fourth step of this process is to repeat the third step, as described above, to correct for imperfect quadrature and to adaptively correct for variations in offset and amplitude. It has been found that by repeating these two operations of the third step a second time, the output signals from the resolver 17 are sufficiently conditioned to provide precise measurement of the relative angular position of the rotor of the motor 11.

In practice, it has been found that it is not necessary to repeat the entire quadrature and adaptive offset/amplitude corrections for every electrical cycle of the resolver 17. For example, the third step of the process described above may be repeated for adaptive offset and amplitude corrections over a predetermined number of mechanical cycles or rotations of the rotatable member of the resolver 17, then fixed at the values determined at that point. The fourth step of the process described above may be repeated, but only for adaptive offset and amplitude corrections over each mechanical cycle, as opposed to each electrical cycle.

The fifth step of this process, as illustrated in FIG. 2, is to determine the electrical angle of the rotor relative to the stator, using the normalized sine and cosine signals. This step can be accomplished by performing a conventional arctangent calculation, wherein the sine and cosine values are translated into an electrical angle value.

The sixth step in this process, as illustrated in FIG. 2, is to correct for repeatable harmonic errors over each electrical cycle of the resolver 17 which cannot be corrected in other ways. This step can be accomplished by providing a look-up table in the memory of the microprocessor of the digital signal processing circuit 14. The value stored in the look-up table is added to the value of the electrical angle signal to correct for these harmonic errors.

The seventh step in this process, as illustrated in FIG. 2, is to calculate the rotational velocity of the rotor of the motor 11. As is well known, the rotational velocity of the rotor can be determined using numerical differentiation techniques, such as Richardson's extrapolation. This results in the following equation:

$$V=[2(\theta_n-\theta_{n-1})-0.5(\theta_n-\theta_{n-2})]/h$$

wherein h is the sampling interval. While this form of numerical differentiation is more noise immune than some, there is still some high frequency noise which should be filtered away. To accomplish this, a simple third order Chebychev filter can be implemented in this step. In this manner, the rotational velocity signal of the rotor of the motor 11 can be calculated and fed to the commutation portion 14a of the digital signal processing circuit 14, as described above.

The eighth step in this process, as illustrated in FIG. 2, is to add a velocity phase adjustment factor to the velocity signal. This is necessary to correct for phase shifts and other factors which are dependent upon the velocity signal. This can be done by providing a simple look-up table in the digital signal processing circuit 14. The velocity phase adjustment signal is added to the summation of the value of the electrical angle signal and the value harmonic error correction signal. The resultant signal is the actual electrical position signal which, as mentioned above, can be fed to the commutation portion 14a of the digital signal processing circuit 14.

The final step in this process, as illustrated in FIG. 2, is to generate the actual mechanical position signal. The actual mechanical position signal is generated by adding a value which is representative of which tooth or electrical cycle is currently being-analyzed to the value of the actual electrical position signal. As also discussed above, the actual mechanical position signal can be fed to the position controller circuit 13.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A method for generating signals which are representative of the position and velocity of a movable member comprising:

generating analog electrical output signals which are representative of an excitation signal modulated by both the sine and cosine of an electrical angular position of the movable member;

demodulating the sine and cosine signals by multiplication with the excitation signal;

adaptively conditioning the demodulated sine and cosine signals to insure quadrature and to correct for amplitude variations;

determining a velocity signal for the movable member;

determining an actual electrical position signal for the movable member; and determining an actual mechanical position signal for the movable member.

2. The method defined in claim 1 wherein the steps of demodulating the sine and cosine signals, adaptively conditioning the demodulated sine and cosine signals, determining a velocity signal, determining an actual electrical position signal, and determining an actual mechanical position signal, are all embodied as software.

3. The method defined in claim 1 comprising the additional step of introducing a predetermined phase shift into the excitation signal before demodulating the sine and cosine signals.

4. The method defined in claim 1 comprising the additional step of removing extraneous higher frequency components from the sine and cosine signals after demodulating the signals.

5. The method defined in claim 1 wherein the amplitude of the demodulated sine and cosine signals is corrected based upon updated amplitude information by defining initial conditions for amplitude.

6. The method defined in claim 1 including the step of determining a value for an electrical angle of the movable member, using the adaptively conditioned sine and cosine signals.

7. The method defined in claim 6 including the step of correcting the value for harmonic errors.

8. A method for generating signals which are representative of the position and velocity of a movable member comprising:

generating analog electrical output signals which are representative of an excitation signal modulated by both the sine and cosine of an electrical angular position of the movable member;

demodulating the sine and cosine signals by multiplication with the excitation signal;

adaptively conditioning the demodulated sine and cosine signals to insure quadrature and to correct for offset variations;

determining a velocity signal for the movable member;

determining an actual electrical position signal for the movable member; and determining an actual mechanical position signal for the movable member.

9. The method defined in claim 8 wherein the steps of demodulating the sine and cosine signals, adaptively conditioning the demodulated sine and cosine signals, determining a velocity signal, determining an actual electrical position signal, and determining an actual mechanical position signal, are all embodied as software.

10. The method defined in claim 8 comprising the additional step of introducing a predetermined phase shift into the excitation signal before demodulating the sine and cosine signals.

11. The method defined in claim 8 comprising the additional step of removing extraneous higher frequency components from the sine and cosine signals after demodulating the signals.

12. The method defined in claim 8 wherein the offset of the demodulated sine and cosine signals are corrected based upon updated offset information by defining initial conditions for offset.

13. The method defined in claim 8 including the step of determining a value for an electrical angle of the movable member, using the adaptively conditioned sine and cosine signals.

14. The method defined in claim 13 including the step of correcting the value for harmonic errors.

15. A method for generating signals which are representative of the position and velocity of a movable member comprising:

generating analog electrical output signals which are representative of an excitation signal modulated by both the sine and cosine of an electrical angular position of the movable member;

demodulating the sine and cosine signals by multiplication with the excitation signal;

adaptively conditioning the demodulated sine and cosine signals to correct for amplitude and offset variations;

determining a velocity signal for the movable member;

determining an actual electrical position signal for the movable member; and determining an actual mechanical position signal for the movable member.

16. The method defined in claim 15 wherein the steps of demodulating the sine and cosine signals, adaptively conditioning the demodulated sine and cosine signals, determining a velocity signal, determining an actual electrical position signal, and determining an actual mechanical position signal, are all embodied as software.

17. The method defined in claim 15 comprising the additional step of introducing a predetermined phase shift into the excitation signal before demodulating the sine and cosine signals.

18. The method defined in claim 15 comprising the additional step of removing extraneous higher frequency components from the sine and cosine signals after demodulating the signals.

19. The method defined in claim 15 wherein the offset of the demodulated sine and cosine signals are corrected based upon updated offset information by defining initial conditions for offset.

20. The method defined in claim 15 including the step of determining a value for an electrical angle of the movable member, using the adaptively conditioned sine and cosine signals.

21. The method defined in claim 20 including the step of correcting the value for harmonic errors.

22. An apparatus for generating signals which are representative of the position and velocity of a movable member comprising:

a resolver for generating analog electrical output signals which are representative of an excitation signal modulated by both the sine and cosine of an electrical angular position of the movable member; and a software based circuit for correcting time varying errors in the sine and cosine signals and converting the corrected signals to digital electrical output signals which are representative of the position and velocity of the movable member, said software based circuit being effective to demodulate the sine and cosine signals by multiplication with the excitation signal, adaptively condition the demodulated sine and cosine signals to insure quadrature and to correct for amplitude variations, determine a velocity signal for the movable member, determine an actual electrical position signal for the movable member, and determine an actual mechanical position signal for the movable member.

23. The apparatus defined in claim 22 wherein the software based circuit executes the additional step of introducing a predetermined phase shift into the excitation signal before demodulating the sine and cosine signals.

24. The apparatus defined in claim 22 wherein the software based circuit executes the additional step of removing extraneous higher frequency components from the sine and cosine signals after demodulating the signals.

25. The apparatus defined in claim 22 wherein the amplitude of the demodulated sine and cosine signals are corrected based upon updated amplitude information by defining initial conditions for amplitude.

26. An apparatus for generating signals which are representative of the position and velocity of a movable member comprising:

a resolver for generating analog electrical output signals which are representative of an excitation signal modulated by both the sine and cosine of an electrical angular position of the movable member; and a software based circuit for correcting time varying errors in the sine and cosine signals and converting the corrected signals to digital electrical output signals which are representative of the position and velocity of the movable member, said software based circuit being effective to demodulate the sine and cosine signals by multiplication with the excitation signal, adaptively condition the demodulated sine and cosine signals to insure quadrature and to correct for offset variations, determine a velocity signal for the movable member, determine an actual electrical position signal for the movable member, and determine an actual mechanical position signal for the movable member.

27. The apparatus defined in claim 26 wherein the software based circuit executes the additional step of introducing a predetermined phase shift into the excitation signal before demodulating the sine and cosine signals.

28. The apparatus defined in claim 26 wherein the software based circuit executes the additional step of removing extraneous higher frequency components from the sine and cosine signals after demodulating the signals.

29. The apparatus defined in claim 26 wherein the offset of the demodulated sine and cosine signals are corrected based upon updated amplitude and offset information by defining initial conditions for amplitude and offset.

30. An apparatus for generating signals which are representative of the position and velocity of a movable member comprising:

a resolver for generating analog electrical output signals which are representative of an excitation signal modulated by both the sine and cosine of an electrical angular position of the movable member; and a software based circuit for correcting time varying errors in the sine and cosine signals and converting the corrected signals to digital electrical output signals which are representative of the position and velocity of the movable member, said software based circuit being effective to demodulate the sine and cosine signals by multiplication with the excitation signal, adaptively condition the demodulated sine and cosine signals to correct for amplitude and offset variations, determine a velocity signal for the movable member, determine an actual electrical position signal for the movable member, and determine an actual mechanical position signal for the movable member.

31. The apparatus defined in claim 30 wherein the software based circuit executes the additional step of introducing a predetermined phase shift into the excitation signal before demodulating the sine and cosine signals.

32. The apparatus defined in claim 30 wherein the software based circuit executes the additional step of removing extraneous higher frequency components from the sine and cosine signals after demodulating the signals.

33. The apparatus defined in claim 30 wherein the amplitude and offset of the demodulated sine and cosine signals are corrected based upon updated amplitude and offset information by defining initial conditions for amplitude and offset.

* * * * *